(12) United States Patent
Johnson et al.

(10) Patent No.: US 9,928,534 B2
(45) Date of Patent: Mar. 27, 2018

(54) DYNAMICALLY GUIDED USER REVIEWS (71) Applicant: Audible, Inc., Newark, NJ (US)

(72) Inventors: Brian Andrew Johnson, New York, NY (US); Edward J. Walloga, Wyckoff, NJ (US); Aaron P. Goldsmid, New York, NY (US); Laurent B. Vauthrin, New York, NY (US); Valerie Gong Bow Gee Lum, New York, NY (US); Scott R. Battaglia, Riverdale, NJ (US); Douglas V. O'Dell, III, Montclair, NJ (US)

(73) Assignee: Audible, Inc., Newark, NJ (US)

( * ) Notice: Subject to any disclaimer, the term of this patent is extended or adjusted under 35 U.S.C. 154(b) by 291 days.

(21) Appl. No.: 14/298,702

(22) Filed: Jun. 6, 2014

(65) Prior Publication Data

US 2014/0289161 A1    Sep. 25, 2014

Related U.S. Application Data (62) Division of application No. 13/370,251, filed on Feb. 9, 2012, now Pat. No. 8,996,425.

(51) Int. Cl.
*G06Q 30/06* (2012.01)
*G06Q 30/02* (2012.01)

(52) U.S. Cl.
CPC ..... *G06Q 30/0631* (2013.01); *G06Q 30/0282* (2013.01)

(58) Field of Classification Search
CPC ............... G06Q 30/02; G06Q 30/0203; G06Q 30/0282; G06Q 10/0639; G06Q 30/0631
See application file for complete search history.

(56) References Cited

U.S. PATENT DOCUMENTS

| 5,344,255 | A  | 9/1994  | Toor |
| 6,829,348 | B1 | 12/2004 | Schroeder et al. |
| 7,428,496 | B1 | 9/2008  | Keller et al. |
| 7,552,068 | B1 | 6/2009  | Brinkerhoff |
| 7,603,367 | B1 | 10/2009 | Kanter et al. |
| 7,664,669 | B1 | 2/2010  | Adams et al. |

(Continued)

OTHER PUBLICATIONS

Best Buy Review page, http://www.bestbuy.com/site/olspage. jsp?id=pcat17100&type=page&bvd . . . , 4 pages retrieved Jan. 9, 2012.

*Primary Examiner* — Carrie S Gilkey
(74) *Attorney, Agent, or Firm* — Knobbe, Martens, Olson & Bear, LLP (57) ABSTRACT

Systems and associated processes for guiding users to provide more useful reviews are described. These systems and processes can provide guided reviews in certain embodiments by presenting questions to a user in the form of an interview. The questions can be relevant to the item being reviewed, and as such, may be specifically and dynamically selected based on the particular item under consideration. Many other criteria may be used to select the types of questions presented to users, examples of which will be described below. Presenting review questions to users can have the effect of reducing or eliminating the "blank page" effect of having to write a review from scratch, with no guidance. Accordingly, review questions can potentially elicit more thorough and useful feedback than existing review systems in some embodiments.

19 Claims, 6 Drawing Sheets (56) References Cited

U.S. PATENT DOCUMENTS

| | | |
|---|---|---|
| 8,001,003 B1 | 8/2011 | Robinson et al. |
| 8,122,371 B1 * | 2/2012 | Keller ................ G06Q 30/0203 |
| | | 715/764 |
| 8,315,895 B1 | 11/2012 | Kilat et al. |
| 8,515,828 B1 | 8/2013 | Wolf et al. |
| 8,645,295 B1 | 2/2014 | Dillard |
| 2004/0009462 A1 | 1/2004 | McElwrath |
| 2004/0024739 A1 | 2/2004 | Copperman et al. |
| 2005/0192958 A1 | 9/2005 | Widjojo et al. |
| 2006/0129446 A1 | 6/2006 | Ruhl et al. |
| 2006/0212362 A1 | 9/2006 | Donsbach et al. |
| 2007/0192166 A1 | 8/2007 | Van Luchene |
| 2007/0226374 A1 | 9/2007 | Quarterman et al. |
| 2008/0028313 A1 | 1/2008 | Ebert |
| 2008/0270326 A1 | 10/2008 | Musgrove et al. |
| 2009/0063288 A1 | 3/2009 | Croes |
| 2009/0083096 A1 | 3/2009 | Cao et al. |
| 2009/0248666 A1 | 10/2009 | Ahluwalia |
| 2009/0276279 A1 * | 11/2009 | Quesnel ................ G06Q 30/016 |
| | | 705/7.29 |
| 2009/0307159 A1 | 12/2009 | Pinckney et al. |
| 2010/0169317 A1 | 7/2010 | Wang et al. |
| 2010/0217654 A1 * | 8/2010 | Keller .............. G06Q 10/06393 |
| | | 705/14.2 |
| 2011/0173191 A1 | 7/2011 | Tsaparas et al. |
| 2011/0251871 A1 | 10/2011 | Rogers et al. |
| 2011/0276513 A1 | 11/2011 | Erhart et al. |
| 2012/0109368 A1 * | 5/2012 | Canter ................ G06Q 30/0237 |
| | | 700/233 |
| 2012/0209751 A1 | 8/2012 | Chen et al. |
| 2012/0278065 A1 | 11/2012 | Cai et al. |
| 2013/0007011 A1 | 1/2013 | Setlur et al. |
| 2013/0117329 A1 | 5/2013 | Bank et al. |
| 2013/0173531 A1 * | 7/2013 | Rinearson ......... G06F 17/30011 |
| | | 707/608 |
| 2013/0204675 A1 | 8/2013 | Dobell |
| 2013/0218914 A1 | 8/2013 | Starvrianou et al. |
| 2015/0205462 A1 * | 7/2015 | Jitkoff .............. G06F 17/30876 |
| | | 715/777 |

* cited by examiner

DYNAMICALLY GUIDED USER REVIEWS

RELATED APPLICATION

This application is a divisional of U.S. application Ser. No. 13/370,251, filed Feb. 9, 2012, the disclosure of which is hereby incorporated by reference in its entirety.

BACKGROUND

Networked systems have become an increasingly prevalent and vital technology. Networks, such as the Internet, allow large numbers of computer systems and people to swiftly transfer data across the globe. These networks are often used to provide network applications, such as web applications and mobile applications, to end users. These web and mobile applications are often hosted by server computers that serve content to end user devices.

For example, ecommerce systems commonly provide various types of informational services for assisting users in evaluating products and other offerings. Such services can greatly aid consumers in deciding which product or offering to purchase. These informational services are particularly valuable for purchases over a network, where customers do not have the opportunity to physically inspect or try out products.

One type of information service involves providing feedback from product users. The feedback may be in the form of reviews that discuss the merits and drawbacks of products and services. Users can read other users' reviews to determine whether to purchase a product or service. Thus, reviews can greatly aid users' buying decisions when shopping from an ecommerce system.

BRIEF DESCRIPTION OF THE DRAWINGS

Throughout the drawings, reference numbers are re-used to indicate correspondence between referenced elements. The drawings are provided to illustrate embodiments of the inventions described herein and not to limit the scope thereof.

DETAILED DESCRIPTION

I. Introduction

User reviews often suffer from incompleteness or lack of clarity in describing an item's merits and drawbacks. These deficiencies may occur in a review because typical review user interfaces merely provide a blank text box or area for users to input their review. A blank text box gives no guidance to users regarding the aspects of an item that would be beneficial to review. As a result, many reviews focus on one or two characteristics of an item to the exclusion of others. Still other reviews are shorter than would be helpful for readers. Short reviews may also be the product of the standard text box review user interface, among other reasons. It can be difficult to write useful review prose from a blank page.

This disclosure describes systems and associated processes for guiding users to provide more useful reviews, among other things. These systems and processes can provide guided reviews in certain embodiments by presenting questions to a user in the form of an interview. The questions can be relevant to the item being reviewed, and as such, may be specifically and dynamically selected based on the particular item under consideration. Many other criteria may be used to select the types of questions presented to users, examples of which will be described below. Presenting review questions to users can have the effect of reducing or eliminating the "blank page" effect of having to write a review from scratch, with no guidance. Accordingly, review questions can potentially elicit more thorough and useful feedback than existing review systems in some embodiments.

For purposes of illustration, the processes disclosed herein are described primarily in the context of an interactive computing system that guides users to create reviews of items in an electronic catalog or catalog system, such as products and services. The interactive computing system can be implemented as a network application, which may be a website, a mobile application, a combination of the same, or the like. As will be apparent, the disclosed processes can also be used in other types of systems, and can be used to guide user reviews of other types of items, such as but not limited to general products or services, electronic books ("ebooks"), websites, news articles, blogs, podcasts, travel destinations, service providers, other users (e.g., as potential friends in a social network), events, locations (such as restaurants and other establishments), discussion boards, photos and other images, online videos, tagged items, and user-generated lists of items.

As used herein, the term "item," in addition to having its ordinary meaning, is used interchangeably to refer to an item itself (e.g., a particular product, service, any of the items referred to above, or the like) and to its description or representation in a computer system. As will be apparent from the context in which it is used, the term is also sometimes used herein to refer only to the item itself or only to its representation in the computer system. Further, not necessarily all advantages described herein are shared by every embodiment of this disclosure.

II. Interactive Computing System Overview

Figure 1:
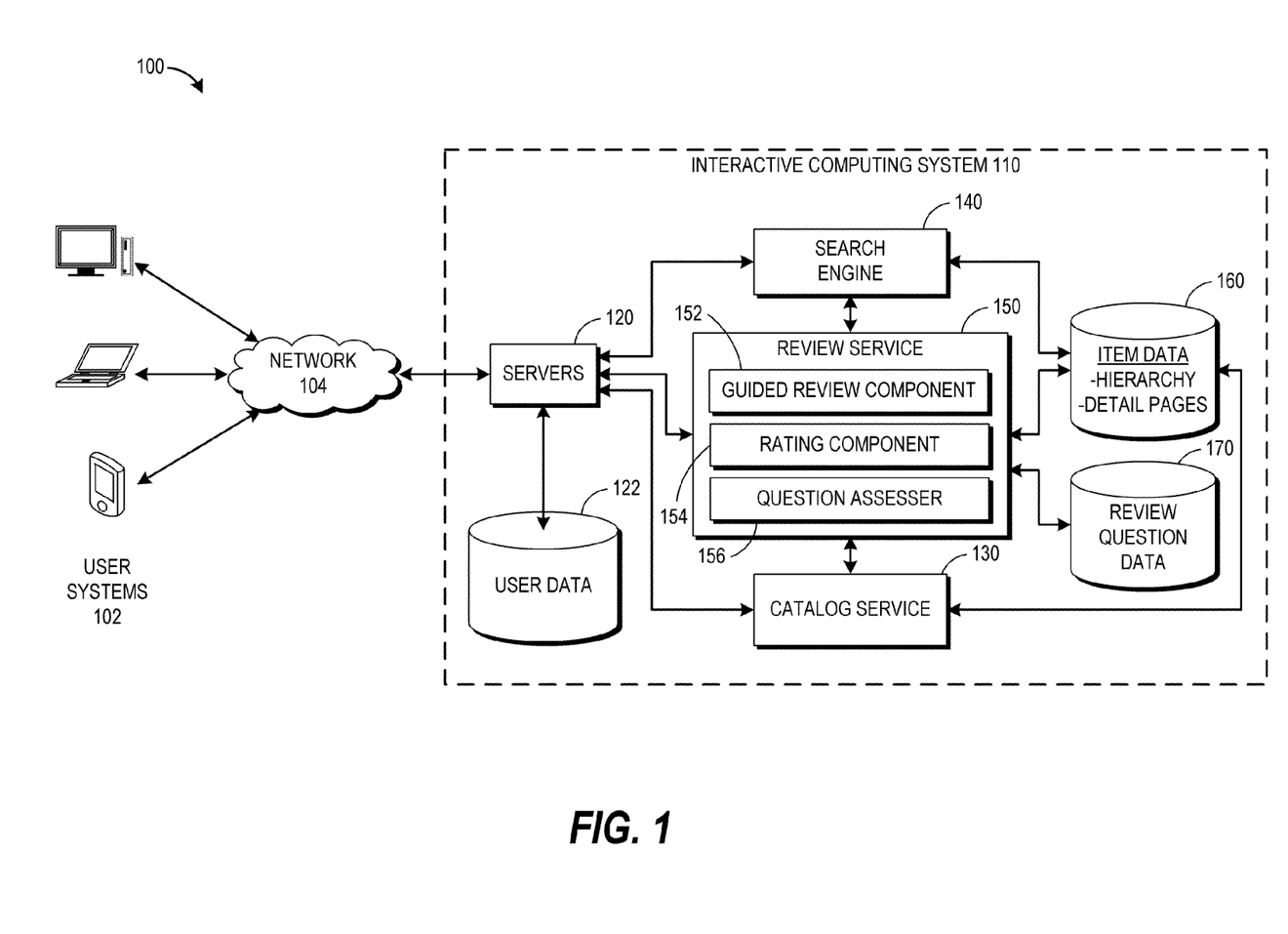
FIG. 1 illustrates an embodiment of a network environment for providing users with access to an interactive computing system for providing guided reviews.

Prior to describing embodiments of guided review functionality in detail, an example computing system in which this functionality can be implemented will be described. Referring to FIG. 1, an embodiment of a network environment 100 is depicted that can provide users with access to an interactive computing system 110 for the purpose of providing guided reviews of items, among other features. In the environment 100, users can access the interactive computing system 110 with user systems 102. The interactive computing system 110 can provide users with access to an electronic catalog of items, which users can browse or search to find items to purchase or otherwise access. The interactive computing system 110 can provide a detail page or other user interface for some or all items. On this or another user interface, the interactive computing system 110 can output a guided review interface that guides users in reviewing items. Advantageously, in certain embodiments, the guided review functionality of the interactive computing system 110 can elicit reviews that are more detailed and helpful for users interested in the items.

The user systems 102 that access the interactive computing system 110 can include computing devices, such as desktop computers, laptop computers, tablets, personal digital assistants (PDAs), mobile phones (including smartphones), electronic book readers, other wireless devices, set-top or other television boxes, media players, game platforms, and kiosks, among others. The user systems 102 access the interactive computing system 110 over a network 104, which can be a local area network or a wide area network, such as the Internet.

The interactive computing system 110 can be implemented with one or more physical servers or computing machines, including the servers 120 shown (among possibly others). Thus, each of the components depicted in the interactive computing system 110 can include hardware and/or software for performing various features. In one embodiment, the interactive computing system 110 is a web site or a collection of web sites, which serve web pages to users. In another embodiment, the interactive computing system 110 hosts content for one or more mobile applications or other applications executed by the user systems 102. For ease of illustration, this specification often refers to user interfaces in the website context. However, it should be understood that these user interfaces can be adapted for display in mobile applications or other applications.

The processing of the various components of the interactive computing system 110 can be distributed across multiple machines, networks, or other computing resources. The various components of the interactive computing system 110 can also be implemented in one or more virtual machines or cloud resources, rather than in dedicated servers. Likewise, the data repositories shown can represent physical and/or logical data storage, including, for example, storage area networks or other distributed storage systems. Moreover, in some embodiments the connections between the components shown represent possible paths of data flow, rather than actual connections between hardware. While some examples of possible connections are shown, any subset of the components shown can communicate with any other subset of components in various implementations.

In one embodiment, the user systems 102 communicate with the servers 120 of the interactive computing system 110. These servers 120 can access back-end computing devices, which may implement the other functionality of the interactive computing system 110 shown. Other computing arrangements and configurations are also possible.

The interactive computing system 110 includes a catalog service 130 and a search engine 140. Users can browse an electronic catalog provided by the catalog service 130 or query the search engine 140 to obtain information about electronic catalog content stored in an item data repository 160. In one embodiment, these items can include items other than (or in addition to) applications, such as media (books, audio, video, etc.), clothes, electronics, and appliances, to name a few. The electronic catalog content can include detailed information about these products as well as services. In one embodiment, this content is arranged in a hierarchical structure, having items associated with one or more categories or browse nodes in a hierarchy (or graph). The catalog service 130 can provide functionality for users to browse the item hierarchy in addition to searching the catalog. Users can select an item represented in the hierarchy or in a list of search results to see more details about an item. In response to a user item selection, the server 120 can provide to a user system 102 a catalog page (sometimes called an item detail page) that includes details about the selected item.

The interactive computing system 110 also includes a review service 150 that enables users to review items in the electronic catalog. In the depicted embodiment, the review service 150 includes a guided review component 152, a rating component 154, and a question assessment component 156. As described above, each of these components can be implemented in hardware and/or software. The guided review component 152 can provide users with a user interface that guides users through review creation. This user interface can output one or more questions to elicit detailed user feedback on an item. These questions can be dynamically selected for the user based on one or more criteria, as will be described in greater detail below. The guided review component 152 can select these questions from a review data repository 170. The review questions stored in the data repository 170 can be initially created by a provider (or worker) of the interactive computing system 110, by vendors of the items, or at least partially by users in some embodiments. The guided review component 152 can provide a user interface for individuals to create the review questions and to optionally associate the review questions with criteria for selecting those questions.

The rating component 154 provides functionality for users to rate items. Optionally, this feature may be omitted. However, ratings provide an easy way for users to express their feelings about an item and a quantitative way for users to see other users' thoughts about an item. There are many examples of ratings systems that may be employed by the rating component 154. For instance, the rating component 154 can implement numerical ratings, such as 4 or 5 star (or other symbol) ratings, bar graphs, graphical meter ratings, or any variety of the same. In another embodiment, the rating component 154 implements binary ratings such as thumbs-up or down ratings, good or bad ratings, recommended or not recommended ratings, and so on. The rating component 154 may also implement ternary rating systems, such as a combination of a binary rating system with a neutral rating option. These are just a few examples of the many rating systems that are compatible with embodiments described herein.

In one scenario, the rating component 154 provides a rating user interface that outputs one or more rating user interface controls for selection by a user. The rating user interface may include ratings for multiple aspects of an item, from which the user can assign one or more ratings to the item. Advantageously, in one embodiment, the guided review component 152 can select one or more review questions based at least in part on the one or more ratings input by the user for an item. The review questions can therefore reflect the sentiment of the user about the item. If the user really liked the book, for example, a review question might be selected that asks the user what about the author's writing style the user liked. As will be noted from this example, the guided review component 152 can also select questions based on characteristics of the item, such as the type of item (a book in this case).

The guided review component 152 can also parameterize review questions based on characteristics of the item being reviewed. This parameterization can include supplying at least part of the text of the review question based on one or more item characteristics. For instance, in the context of audiobooks, an audiobook can have characteristics such as a title, a narrator name, and an author name. If the guided review component 152 identifies an item for review as an audiobook, the guided review component 152 can populate review questions with the audiobook's characteristics. As an example, in the question "What did you think of [narrator]'s performance?," the guided review component can replace the text [narrator] with the actual name of the narrator of a particular audiobook being reviewed. In cases where multiple aspects are to be parameterized (such as multiple narrators for an audiobook), a question can be populated with the plural item aspect (such as "narrators"). Other examples of question parameterization are described below (see the "Example Review Questions" section). For illustration purposes, many of the examples herein are described in the context of audiobooks. However, it should be understood that these examples can be adapted to other types of items, such as the example types of items described above.

The remaining component in the review service 150, the question assessment module 156, can evaluate or otherwise assess one or more aspects of the review questions stored in the data repository 170. This component 156 may also be omitted in some embodiments. However, in other embodiments, the question assessment module 156 beneficially evaluates the effectiveness of review questions in eliciting user feedback. The question assessment module 156 can measure this effectiveness based on the length of responses to the questions or based on other factors, such as users' perceived helpfulness of reviews. These assessments can be used by the guided review component 152 to determine which questions to select for presentation to users. Questions that are more effective, or that have higher quality, may be assessed, scored, or otherwise rated higher than other questions and thus selected over other questions. Of course, a review question's assessed value may be one factor of several used to select questions in several embodiments. For instance, some questions that are rated lower than other questions may still be presented to users to promote question variety among reviews. Additional example features of the question assessment module 156 are described in greater detail below with respect to FIG. 4.

III. Guided Review Overview

Figure 2:
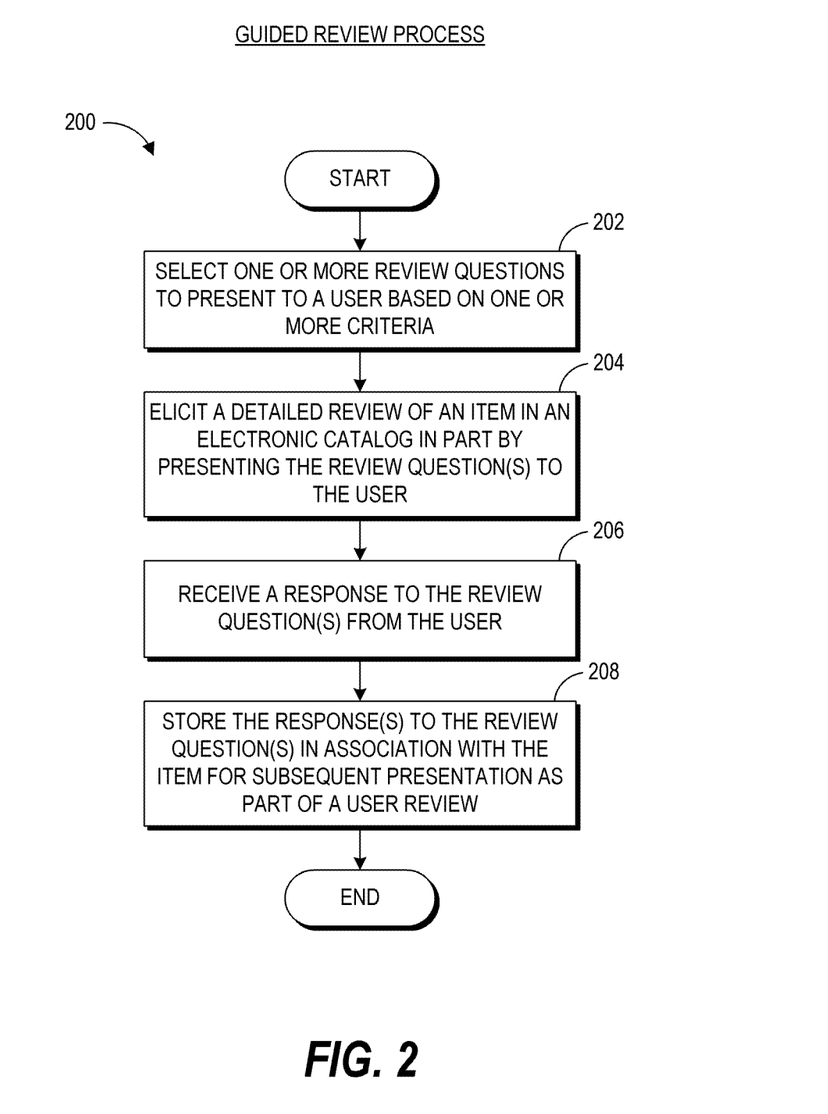
FIG. 2 illustrates an embodiment of a process for guiding user reviews.

FIG. 2 illustrates an overview embodiment of a guided review process 200. As described above, guided reviews can be provided by selecting one or more review questions to present to users. The process 200 can select these questions and use the user responses to create a review. Any computing device can implement the process 200. For ease of illustration, however, the process 200 is described as being implemented by the interactive computing system 110, and in particular, the guided review component 152.

At block 202, the process 200 begins by the guided review component 152 selecting one or more review questions to present to a user based on one or more criteria. The guided review component 152 may select the review questions in response to a user request to review an item. This user request may come in many forms, one example of which is a user selecting a "review this item" link or the like provided by a user interface of the interactive computing system 110. A user-selectable link (or other user interface control) to review an item may be provided on an item detail page or user interface associated with an item.

In another scenario, the guided review component 152 selects review questions without first receiving a user request to review an item. Many users that purchase or otherwise access items do not review them soon after purchase. In such situations, the interactive computing system 110 may send an email, text message, or other electronic message to a user that invites him or her to review the item. The guided review component 152 may populate this email with review questions, selecting the review questions before ever receiving an indication from the user that the user will write a review. Advantageously, in such embodiments, the review questions may spark some users' interest in creating a review and thereby cause more users to write reviews. A related scenario is where the interactive computing system 110 sends an email inviting a user to write a review, but the email may simply have a link to a review user interface. The guided review component 152 can populate the review user interface with selected questions.

At block 204, the guided review component 152 elicits a detailed review of an item at least in part by presenting the review question or questions to the user. Each question may be presented together with a text box in which a user can input text of an answer. In another embodiment, the guided review component 152 outputs one or more user interface controls other than a text box for users to respond to the questions. Examples include checkboxes, radio buttons, drop-down lists (select boxes), and the like. For instance, the guided review component 152 might output a question like "How long did the battery life of this device last?" having checkboxes with options such as 1-2 hours, 2-3 hours, 3-4 hours, etc. Combinations of different user interface controls may also be presented to users for answer input.

The number of questions that the guided review component 152 selects to present to a user can vary in different embodiments. The number of questions presented may be a preset amount, such as one, two, three, four, five, or more questions. Alternatively, the number of questions presented can be chosen dynamically by the guided review component 152. For instance, the guided review component 152 can present questions to users one at a time. Once a user has answered one question, the guided review component 152 can determine whether to give the user another question. The guided review component 152 can make this determination based on the length and/or content of the previous response to a previous review question, among possibly other factors. If the response is long, in one embodiment the guided review component 152 asks the user another question (e.g., up to a set number of questions). If the response is short, or if multiple responses are getting shorter in succession, the guided review component 152 may stop asking questions, as the shortness of the user's response may indicate a lack of interest in proceeding further. In still other embodiments, the guided review component 152 asks a question and then asks the user whether he or she would like to answer another question. Once the user says no, the review can be complete. The guided review component 152 can also provide user interface controls that enable a user to pass on a question and obtain another question instead.

The guided review component 152 may also take a user's past behavior into account when selecting a number of questions to present to a user. If the user has traditionally answered several questions, for instance, the guided review component 152 may present several questions to the user again, and vice versa. If no review history information is available for a user, a default number of questions can be provided.

At block 206, the guided review component 152 receives a response to the review question or questions from the reviewer. The responses may include text, video uploaded by a user, or other media (such as images or audio) uploaded by a user. The guided review component 152 stores the response(s) to the review question(s) in association with the item for later presentation as part of a user review. Subsequently, when another user accesses an item detail page describing the reviewed item, the guided review component 152 can output the review created by the user. The guided review component 152 can output the questions and answers or just the answers.

In another embodiment, customer reviews are searchable by the search engine 140 and may appear in search results in response to user keyword searches (e.g., together with data representing an item). The search engine 140 may provide a separate search box for review queries in addition to normal queries. Thus, in one embodiment, the search engine 140 provides two search (text) boxes—one that users can search for items with and another that users can search reviews with. That way, a user can search for a particular item, such as a digital camera, with a desired attribute (or "not" an attribute in a Boolean sense) such as "long battery life" as expressed in user reviews. This functionality can be provided in a single text box using a special keyword, such as "review(*)" or the like, where the * in the parentheses denotes the text to search in reviews. For example, a user conducting the above digital camera query might search for '"digital camera" and review("long battery life")' in a single search box.

Guided reviews can advantageously facilitate targeted search results in certain embodiments because the semantic structure of guided reviews' question-and-answer format can be used by the search engine 140 as a clue as to what concepts a customer review covers. The search engine 140 can treat this information about what is covered in a review with greater weight or confidence than concepts mined from freeform reviews, due to the semantic structure. Thus, the search engine 140 may be able to provide more interesting or relevant search results to users who search guided reviews.

In addition to storing reviews for subsequent presentation to users, the guided review component 152 can also mine the text of user reviews to obtain metadata about reviews. Advantageously, in certain embodiments, the semantic structure of guided reviews can be easier to parse and apply natural language processing (NLP) techniques to due to the question and answer format. Thus, for example, a question like "What is the battery life of this device like?" might elicit responses that are more computationally feasible to analyze in terms of a device's battery life than mining that same information from a freeform review. Some answers may be particularly easy to parse and analyze if they are provided using checkboxes, radio buttons, or other similar user interface controls that may not allow freeform text input.

The guided review component 152 can present this metadata about reviews to users and/or item vendors. In one embodiment, the guided review component 152 performs statistical analysis on the metadata and presents this statistical analysis or information to users and/or item vendors. An example of such statistical analysis might be calculating the percentage of users who express some sentiment or characteristic about an item, or calculating the mean or other statistic of users who express some sentiment or characteristic about an item. For instance, the guided review component 152 might calculate that 75% of users mention long battery life for an electronic device and might output on an item detail page and/or together with reviews of an item that "3 out of 4 users say that this device has long battery life." The guided review component 152 can also use this statistical analysis as a factor in question selection. If many users are expressing a certain characteristic or sentiment about an item, the guided review component 152 can ask subsequent reviewers what they think about that characteristic or sentiment.

Another potential use of guided reviews is to determine consumer sentiment about different items and provide this information to vendors. For instance, in the audiobook context, a provider of the interactive computing system 110 might poll guided reviews to determine consumer sentiment regarding audiobook narrators and use this information to determine whether to hire such narrators again or accept items from publishers that use those narrators.

IV. Review Question Selection Criteria

Figure 3A:
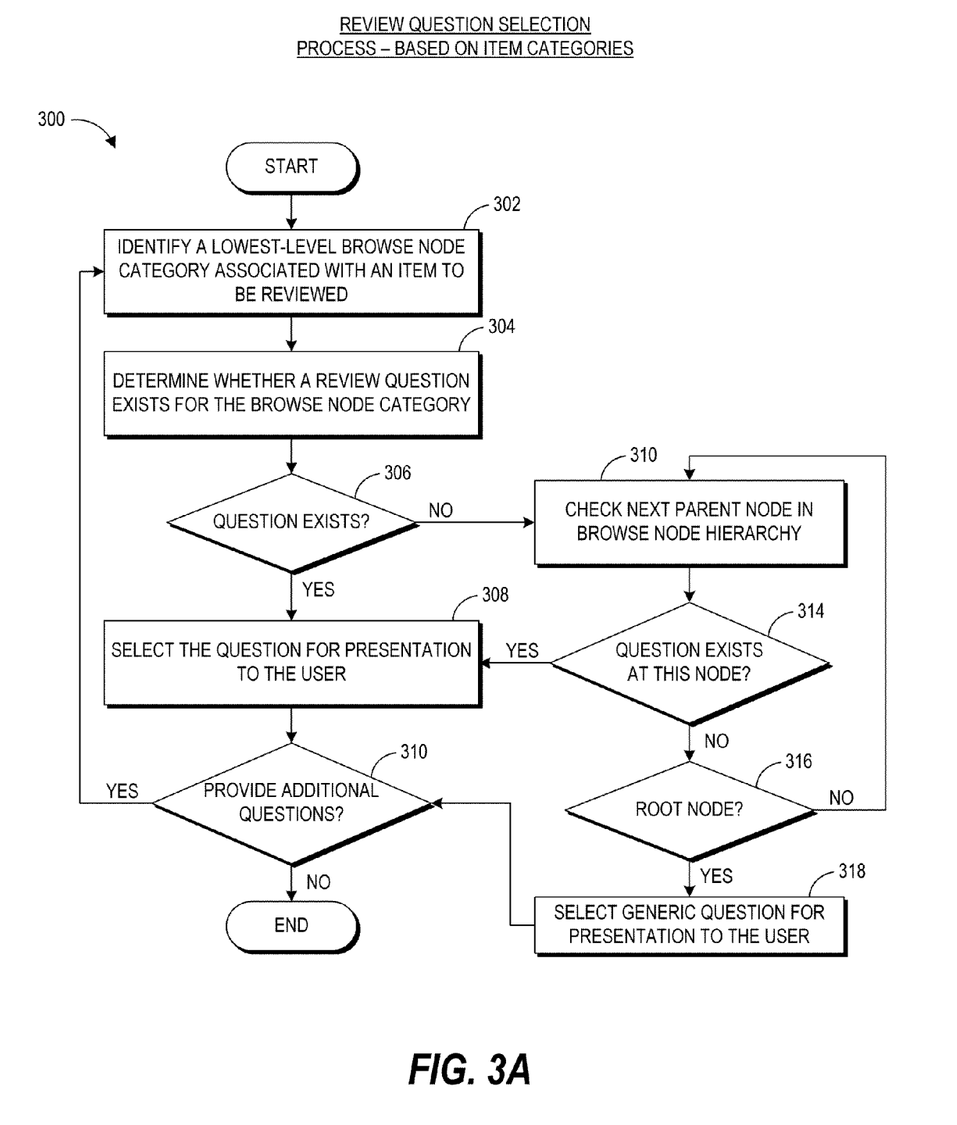
FIGS. 3A and 3B illustrate some embodiments of processes for selecting review questions.
Figure 3B:
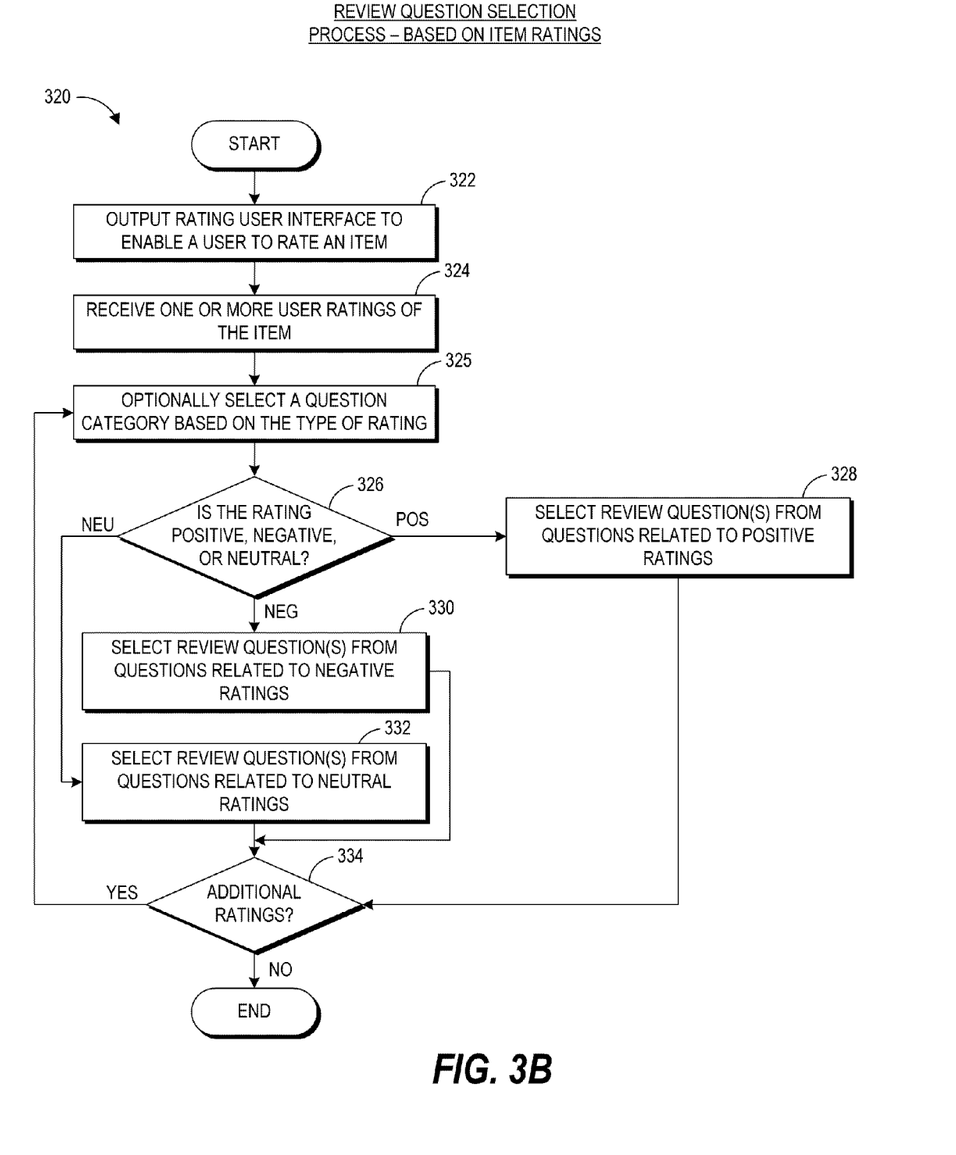

FIGS. 3A and 3B illustrate embodiments of processes 300, 320 for selecting review questions, depicting some example criteria that may be used to select review questions. These processes 300, 320 may be used together, independently, or in conjunction with other criteria (described below). Each of these processes can be implemented by any computing device. However, for ease of illustration, these processes will be described in the context of the interactive computing system 110.

Referring specifically to FIG. 3A, the process 300 can select review questions based on item categories or browse nodes associated with items in an electronic catalog. As described above with respect to FIG. 1, the interactive computing system 110 includes a catalog service 130 that can access electronic catalog or other item data from a data repository 160. This electronic catalog information can be arranged hierarchically, with a general "items" (e.g., "all products") root-level browse node category and more detailed child and descendant browse node categories. Some or all of the items may be associated with one or more categories. In particular, an item can be associated with a leaf-node category, which may be most specific to that item. In turn, this leaf-node category may be part of a broader category, which is in turn part of a broader category still, and so on, up and until the root node. While the terms "browse node," "browse category," and "category" are often used interchangeably herein, it should be understood that categories can be arranged in a flat structure instead of a hierarchical structure in some embodiments. Similarly, an electronic catalog may have a graph data representation instead of a hierarchical, tree-based representation.

At block 302 of the process 300, the guided review component 152 identifies a lowest-level browse node category associated with an item to be reviewed. Examples might include a "historical fiction" category for a book, a "Digital SLR" category for cameras, and so forth. The guided review component 152 determines whether a review question exists for the browse node category at block 304. In one embodiment, the guided review component 152 determines whether a suitable review question exists, based on such factors as the sentiment of the user (see FIG. 3B), stored quality assessments of review questions, and the like. Thus, a question might be associated with the browse node category in the review question data repository 170, but the question may or may not be suitable based on these or other factors.

If a question exists (or a suitable question exists, block 306), the guided review component 152 selects the question for presentation to the user at block 308. The guided review component 152 determines whether to provide additional questions to the user at block 310 using, for example, the criteria described above with respect to FIG. 2. If additional questions are to be provided, the process 300 loops back to block 302; otherwise, it ends.

If a question (or suitable question) is not available at block 306, the guided review component 152 checks the next parent node in the browse node hierarchy for a question at block 310. If a question (or suitable question) exists at this node (block 314), the process 300 proceeds to block 308, where the guided review component 152 selects the question for presentation to the user, followed by proceeding to block 310 as above. Otherwise, it is further determined whether the root node has been reached at block 316. If not, the process 300 loops back to block 310 to check for questions at the next-highest node. Otherwise, the guided review component 152 selects a generic question from a pool of generic questions for presentation to the user at block 318. The process 300 then proceeds again to block 310, where either additional questions are selected or the process 300 ends.

Many modifications can be made to the process 300 as shown. For instance, the guided review component 152 can traverse the hierarchy in reverse order to find questions, beginning at the root node and working down to the lowest-level browse node associated with an item. In yet another embodiment, the guided review component 152 gathers available or suitable questions from multiple or all nodes and selects the highest-rated questions (or some subset of highly-rated questions) to present to the user.

In another embodiment, the guided review component 152 can look for questions at any node related to the item in the hierarchy. For example, the guided review component 152 can select generic questions (e.g., associated with the root node) even if other questions exist in the hierarchy. The guided review component 152 can also select questions from any portion of the hierarchy. In one such embodiment, the guided review component 152 weights questions according to how close they are in the hierarchy to the item being reviewed, with questions from more general nodes being weighted lower. These weightings can be used to compare the relative strength of questions, such that with other criteria being equal, the guided review component 152 may select a question with a higher weighting over another question with a lower weighting. Other examples of weightings are described below with respect to FIG. 4 (which may be combined with or otherwise used to modify the weightings described herein with respect to FIG. 3A). Other variations and question selection criteria are possible.

For instance, turning to FIG. 3B, another embodiment of a process 320 is shown that illustrates different criteria for selecting review questions. In this process 320, user sentiment, as measured by item ratings, is used to select questions. In addition, when multiple types of ratings are provided for a single item, review questions can be selected from different categories corresponding to the type of rating.

Accordingly, at block 322, the rating component 154 of the interactive computing system 110 outputs a rating user interface to enable a user to rate an item. The rating user interface may include options to provide an overall rating for an item or to rate multiple aspects or characteristics of an item. In the context of audiobooks, for example, ratings might be provided for the story's content as well as the narrator's performance, optionally in addition to an overall rating (see, e.g., FIG. 5). As another example, ratings for a tablet computer might be provided for ease of use, features, screen quality, value for the price, and so forth. Thus, at block 324, the rating component 154 receives one or more user ratings of the item.

At block 325, the guided review component 152 can optionally select a question category based on the type of rating provided. Example question categories for the audiobook example can include story questions, narrator performance questions, and overall questions. Questions subsequently selected by the guided review component 152 in the process 320 can be selected from this chosen category. Alternatively, the category selection can optionally be omitted if a single rating was given for the item. In some embodiments, users might only provide one rating (such as an overall rating), even though options to provide other ratings (such as story and narrator) exist. The process 320 may still select a question from an unrated category in some embodiments to increase question variety, although in other embodiments, questions from these unrated categories are not selected.

At block 326, the guided review component 152 determines the sentiment of a user with respect to the rating, for example, by determining whether the rating was positive, negative, or neutral. Depending on the answer, either a positive, negative, or neutral question is selected from the (optionally chosen) category at blocks 328, 330, and 332 respectively. The sentiment of a rating can be determined easily from binary (e.g., thumbs-up or down) or ternary (up or down plus neutral) ratings. In numerical rating systems, such as 5-symbol rating systems, sentiment can be inferred based on the numerical value of the rating. In a 5-symbol rating system, for instance, 1-2 symbols can be considered negative, 3 symbols can be considered neutral, and 4-5 symbols can be considered positive. Neutral sentiment may be omitted from the question selection process 320 in some embodiments.

Positive questions can be used to elicit positive feedback from a user about an item, while negative or neutral questions can be selected to elicit critical feedback from a user. Detailed examples of positive, negative, and neutral questions are provided below in the section entitled "Example Review Questions."Even if a user has solely positive or negative (or neutral) ratings, the guided review component 152 can optionally select at least one question from a different sentiment than is reflected in the user's rating to promote balanced reviews.

At block 334, the guided review component 152 determines whether the user provided any additional ratings. If so, the process 320 loops back to block 325 to optionally select an additional review question. Otherwise, the process 320 ends.

As described above, the features of the processes 300 and 320 may be combined to select questions for guided reviews. For instance, at block 304 of the process 300 (FIG. 3A), the guided review component 152 can determine whether a suitable review question exists for a browse node category. Suitability can be determined in an embodiment using the process 320 of FIG. 3B. Thus, for example, the guided review component 152 can first find a browse node associated with an item, such as "historical fiction," then determine the user's sentiment (e.g., positive in one example), and then select a historical fiction question with the chosen sentiment (e.g., "What did you like about the historical setting of this novel?"). This analysis can be reversed in other embodiments, with the guided review component 152 first determining available questions related to a user's sentiment and then finding browse node category questions that are related to that sentiment.

Other criteria may also be used to select questions, such as question quality or ratings (see FIG. 4), questions related to the service of the item provider (such as shipping and handling-related questions), questions related to the price of an item, and so forth. Any of the review question selection criteria herein can be used to calculate a rating or weighting for review questions, such that review questions may be scored and compared. Even though review questions may be rated, however, at least some review questions may be selected randomly (e.g., without regard to rating) in order to promote question variety in some embodiments.

V. Example Review Questions

The following are example review questions that might be provided for different question categories. Question categories included in this example are the following: a general (catch-all) category, a performance category, a story category, and an overall experience category. The questions are specific to audio books but could be adapted to other types of items.

Under the General question-type category, the following are some examples of review questions that may be provided for different browse nodes of an audiobook catalog (the word "title" in brackets indicates that the actual title of an audiobook can be inserted):

Fiction browse node:
  Who were the characters you most Identified with and why?
  Was there a moment in the book that particular moved you?
  If you were to make a film for this book what would be the tag line?
Non-Fiction browse node:
  What was an idea from the book that you will remember?
  What did you learn from [title] that you would use in your daily life?
All books browse node:
  Was [title] worth the listening time?
  Did it inspire you to do anything?
  If you had to re-write the title for [title] what would it be?
Sci-Fi/Fantasy browse node:
  What was the "Big Idea" for this story? Did it work for you?
  How would you compare this to other books in the Sci-Fi/Fantasy?
Business browse node:
  What did you take away from [title] that you would apply to you work?
  Who do you think would benefit most from listening [title]?

Below are example questions under a Performance question-type category, reflecting different questions that might be provided based on a user's rating of a narrator's performance in reading an audiobook. These questions are grouped according to user sentiment (positive, neutral, and negative) rather than browse node (with "[narrator]" indicating that the name of the narrator can be inserted):

Positive sentiment:
  What about [narrator]'s performance did you like?
  How did the narrator make the book better?
Neutral sentiment:
  What worked? What didn't?
  Would you like to a book narrated by [narrator] again?
Negative sentiment:
  How did the [narrator] detract from the book?
  What didn't you like about [narrator]'s performance?

Below are example questions under a Story question-type category, reflecting different questions that might be provided based on a user's rating of the story of an audiobook. These questions are also grouped according to user sentiment (positive, neutral, and negative) rather than browse node (with "[author]" indicating that the name of the author can be inserted):

Positive sentiment:
  What was your favorite part of the story and why?
  What did you find the most compelling about the book?
Neutral sentiment:
  Why would/wouldn't you recommend the [author]'s book to a friend?
Negative sentiment:
  What was the most disappointing about [author]'s story?
  What would have made [author]'s story better?

Below are example questions under an Overall question-type category, reflecting different questions that might be provided based on a user's rating of an audiobook overall. These questions are also grouped according to user sentiment (positive, neutral, and negative) rather than browse node (with "[title]" indicating that the name of the title can be inserted):

Positive sentiment:
  What about [title] did you connect with?
  What about [title] did you enjoy the most?
Neutral sentiment:
  If a friend asked you about this book what would you say?
  What would you have wanted to improve upon in [title]?
Negative sentiment:
  How did [title] not live up to your expectations?
  What about the [title] did you not like? Who might like it?

VI. Review Question Assessment to Improve Question Selection

Figure 4:
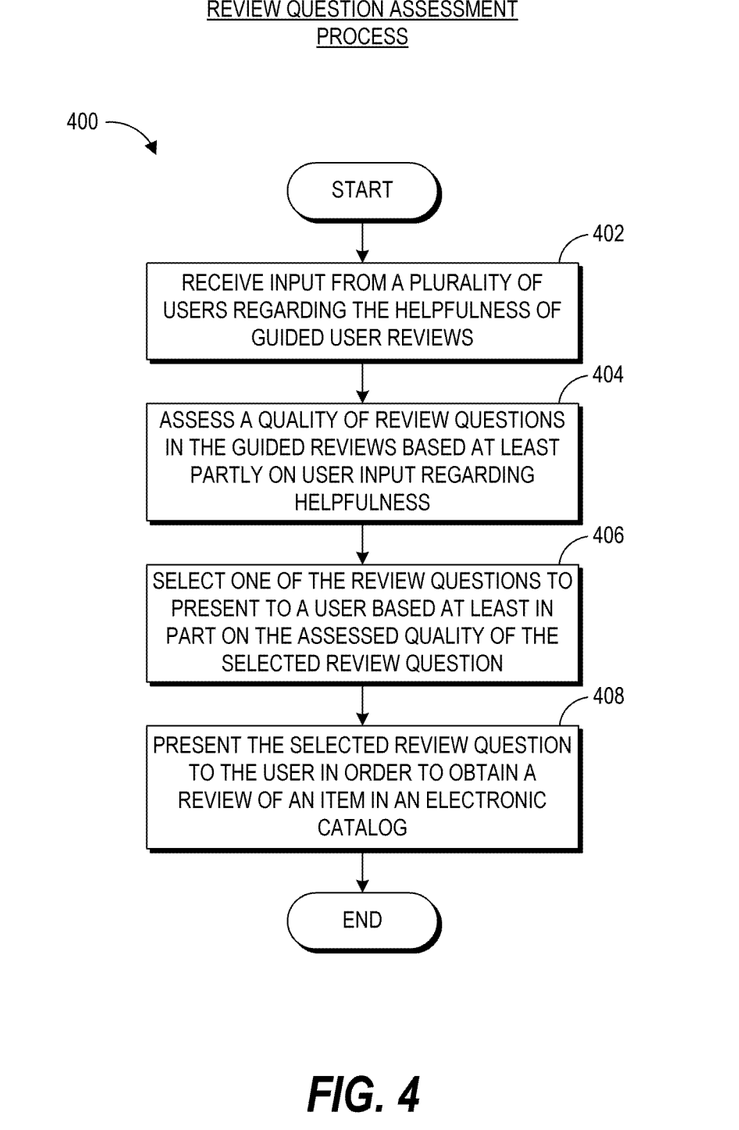
FIG. 4 illustrates an embodiment of a process for assessing review questions.

FIG. 4 illustrates an embodiment of a process 400 for assessing the quality of review questions. The quality of reviews, as assessed by the process 400, can enable the guided review component 152 to select questions that may elicit more feedback than other questions. This quality assessment is optional in several embodiments but may also improve guided reviews in other embodiments. While any computing system can implement the process 400, the process 400 is described as being implemented by the question assessment module 156 of FIG. 1.

At block 402, the question assessment module 156 receives input from a plurality of users regarding the helpfulness of guided user reviews. This helpfulness input may be provided in a variety of ways. One approach is for the review service 150 of FIG. 1 to output yes/no buttons next to user reviews, together with a question like "Was this review helpful?" Similar yes/no buttons could instead be placed next to individual questions in completed guided reviews. Users who are browsing items in an item catalog can read reviews, assess whether they are helpful, and then select the appropriate yes/no button to vote on the usefulness of a review. This type of feedback can be helpful for other users who are looking for the most helpful reviews to read. Advantageously, in certain embodiments the question assessment module 156 can also take advantage of this feedback to infer the quality or usefulness of review questions contained in those reviews.

Accordingly, at block 404, the question assessment module 156 assesses a quality of review questions in the guided reviews based at least partly on user input regarding helpfulness. In one embodiment, the question assessment module 156 infers that a first review question is a higher quality question than a second review question if the reviews the first question appears in are voted more helpful than reviews the second question appears in. The question assessment module 156 can quantify this quality assessment in any number of ways. One approach is to count the number of positive votes for a particular question that occur over multiple reviews and determine whether this vote exceeds the mean helpfulness of review questions. The amount that this vote value exceeds the mean helpfulness can be a score or can be used to derive a score for a question. The question assessment module 156 can assign scores or ratings to questions based on this or other computational analysis and store these scores or ratings with the reviews in the data repository 170 (FIG. 1).

At block 406, the guided review component 152 selects at least one of the review questions to present to a user based at least in part on the assessed quality of the selected review question. The guided review component 152 may use this assessed quality, such as the scores or ratings, in conjunction with or separate from the criteria described above with respect to FIG. 3A or 3B. At block 408, the guided review component 152 presents the selected review question to the user in order to obtain a review of an item in an electronic catalog.

If the guided review component 152 presents multiple questions to users, in one scenario the guided review component 152 can output questions with higher quality scores first (e.g., highest on a page) and questions with lower quality scores subsequently (e.g., lower on a page). With many systems, review helpfulness information may not be readily available at first. Thus, the guided review component 152 can select questions without regard to their assessed quality (e.g., randomly) until question ratings are established.

In one embodiment, the guided review component 152 weights questions based on their scores as part of an overall analysis of multiple criteria, including sentiment, question category, browse node category, and so forth. Questions that are otherwise good candidate questions (e.g., have matching sentiment and browse node) may be downweighted by the guided review component 152 based on their quality scores. The guided review component 152 can select questions that have higher scores than others for output to a user. In other embodiments, the guided review component 152 still selects questions with lower quality scores to output to users so as to promote review variety. Having different questions in different reviews can promote a more complete picture of a product's qualities and drawbacks than reviews that each address the same issues. However, providing this question variety among reviews is also optional.

Although helpfulness is described as being determined based on user input received with respect to user reviews, helpfulness may also be determined using other techniques. For instance, in one embodiment helpfulness is determined at least in part by determining how long users view user reviews and by inferring the helpfulness of the user reviews from the determined viewing length. Users that view a particular review longer than others may find a review more helpful than other reviews that users skim or pass over. The length of time that a user reads a review can be determined at least in part by determining a period of time in which a portion of a display showing the user review is in an active pane on a user device (such as one of the user systems 102). This time information can be obtained from a browser or other application that displays the user review.

Many other factors may be taken into account in inferring the helpfulness of a review. For instance, if the time period of a user's viewing of a review is very long, the user may have simply walked away from the user device, turned to another project, fallen asleep, or the like. Thus, time periods after a certain threshold can be considered to not add to a review's helpfulness score or evaluation. In another embodiment, the helpfulness score calculated for a review may be normalized based on the length of a review, as longer reviews simply take longer to read. However, in some embodiments, longer reviews may be given a higher score due to being more detailed. Many other approaches are possible for scoring and inferring review helpfulness and in turn evaluating the quality of guided review questions.

VII. Example Guided Review for Audiobooks

Figure 5:
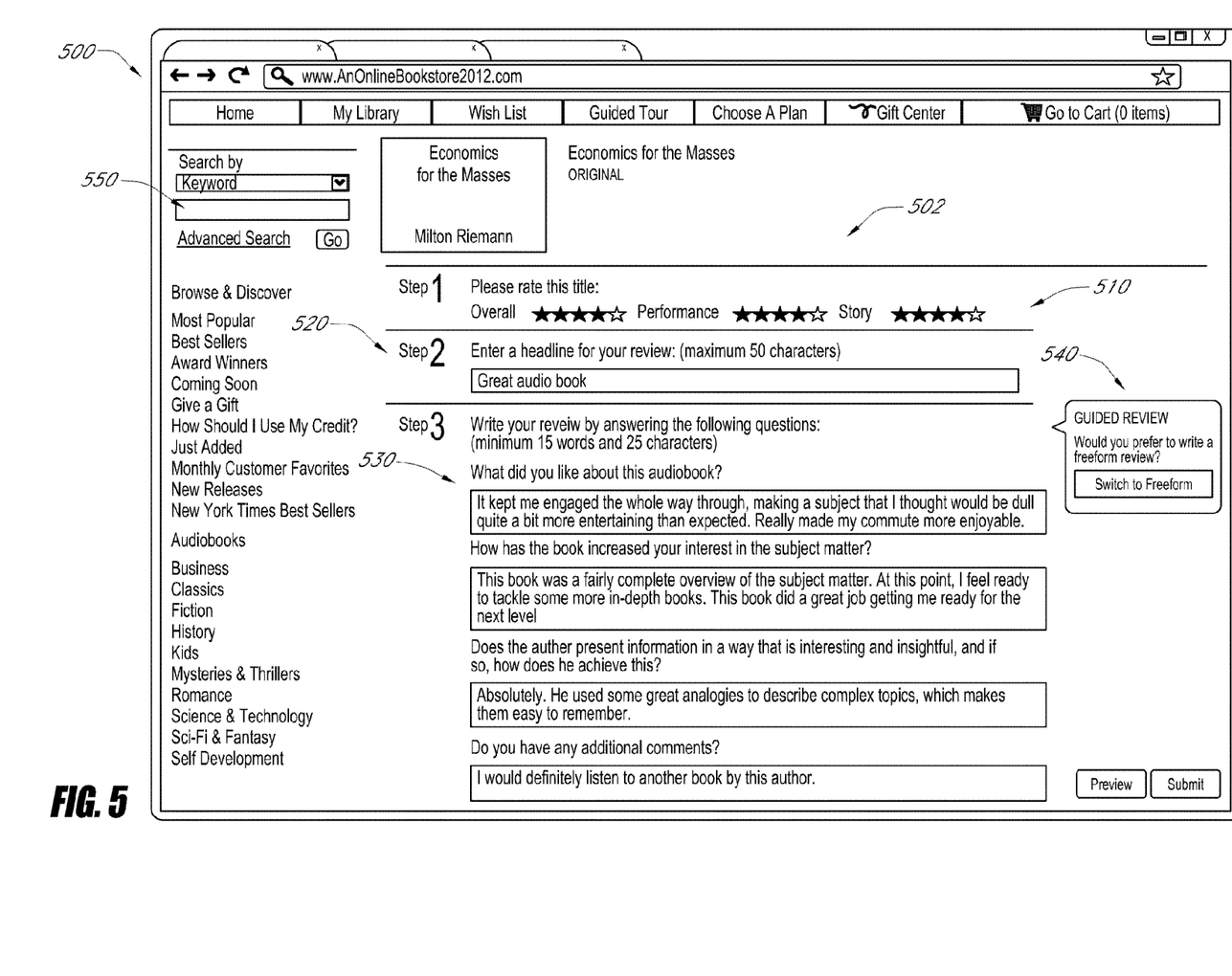
FIG. 5 illustrates an example of a user interface for presenting review questions to users.

FIG. 5 illustrates an example guided review user interface 500 for presenting review questions to users in the context of audiobooks. The user interface 500 is implemented in a web browser for illustrative purposes. As discussed above, a similar user interface could be implemented in a mobile application or the like.

The guided review user interface 500 includes a review form 502 for providing a guided review of an item. The review form 502 includes controls 510 for rating items, controls 520 for titling a review, and controls 530 for outputting questions and supplying answers. In one embodiment, changing one of the ratings using controls 510 can result in the guided review component 152 dynamically outputting different questions using the controls 530. However, if a user has already begun to answer a question, the guided review component 152 might not change that question to a different one. Five questions are shown in the depicted example, one of which is a catch-all "Do you have any additional comments?" question. This last question invites a user to enter more freeform-style review comments. Thus, guided reviews can include both guided questions and freeform review aspects. Further, an option 540 is provided on the side of the user interface to switch to a freeform review (e.g., not having guided review questions) if desired.

VIII. Additional Embodiments

As described above with respect to FIG. 1, the guided review component 152 can output a user interface that enables individuals to create or edit questions. Certain users can create the review questions using this user interface. In one embodiment, users with a certain status with the interactive computing system 110 can be permitted to create review questions. For example, in some embodiments of the interactive computing system 110, a review ranking is established for users who review items frequently and/or that provide helpful reviews (e.g., as rated by other users). If a user is ranked highly, or has some ranking or other review status criteria, a provider of the interactive computing system 110 may invite the user to participate in review question creation. The interactive computing system 110 can automatically extend this invitation to certain users that meet predefined criteria. In one scenario, users with an expertise in a particular browse node (e.g., who have related credentials or have created several reviews in a browse node) may be invited to create or edit review questions in that browse node. Allowing these users to create review questions can promote higher quality review questions than generic content editors may be able to provide. Incentives can be provided to users (or vendors) that create review questions, including discounts, credits, more exposure, combinations of the same, or the like.

IX. Conclusion

Many embodiments of systems and processes have been described for providing guided reviews. Among many other features described herein, these systems and processes can dynamically tailor a review question or topic to a user's rating of an item or to an attribute of an item (such as genre). The systems and processes can also classify review questions so that the review questions can be matched to a hierarchical browse structure. Further, these systems and processes can display a set of dynamically generated questions that cover different attributes or characteristics of a piece of content. The review questions generated by these systems and processes can be parameterized with specific attributes of the content. Moreover, the systems and processes may randomize the questions provided to introduce some diversity in a review or among a plurality of reviews.

X. Terminology

Many other variations than those described herein will be apparent from this disclosure. For example, depending on the embodiment, certain acts, events, or functions of any of the algorithms described herein can be performed in a different sequence, can be added, merged, or left out all together (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure. Further, the headings used herein should not be used to limit the scope of the claims, as they merely illustrate example embodiments.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. For example, any of the signal processing algorithms described herein may be implemented in analog circuitry. A computing environment can include any type of computer system, including, but not limited to, a computer system based on a microprocessor, a mainframe computer, a digital signal processor, a portable computing device, a personal organizer, a device controller, and a computational engine within an appliance, to name a few.

The steps of a method, process, or algorithm described in connection with the embodiments disclosed herein can be embodied directly in physical computer hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of non-transitory computer-readable storage medium, media, or physical computer storage known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others.

What is claimed is:

1. A method of performing guided reviews of items, the method comprising:

receiving a request for a review question for a first item in an electronic catalog;

accessing a linked data structure comprising a plurality of item category nodes that are arranged hierarchically, wherein each of the item category nodes corresponds to one or more items in the electronic catalog and each of the item category nodes is linked to another item category node;

identifying, from the plurality of item category nodes, a first item category node corresponding to the first item;

determining that the first item category node does not have a corresponding review question;

selecting, from the linked data structure, a second item category node linked to the first item category node;

determining that the second item category node has a plurality of review questions, wherein each of the review questions corresponds to either a positive or negative question category;

receiving first web data comprising a first user rating for the first item;

determining that the first user rating has a negative aspect;

identifying, from the plurality of review questions, a first review question with a respective negative question category that matches the negative aspect of the first user rating;

determining helpfulness of the first review question to which users have provided answers;

assessing a quality of the first review question based at least in part on the determined helpfulness of the first review question;

selecting the first review question to present to a first user, said selecting performed based at least in part on the assessed quality of the first review question; and transmitting second web data comprising the first review question for presentation to the first user in order to elicit a review of the first item in the electronic catalog from the first user;

wherein at least said assessing and selecting are performed by a computer system comprising computer hardware.

2. The method of claim 1, further comprising assigning a weighting to the first review question based on the assessed quality and performing said selecting of the first review question based at least in part on the weighting.

3. The method of claim 2, wherein said determining the helpfulness of the first review question comprises, in part, analyzing data representing a number of the users that indicated that the first review question was helpful.

4. The method of claim 3, wherein said assessing the quality of the first review question comprises assigning a greater weighting to the first review question that has a greater number of the users that indicated that the first review question was helpful relative to another review question having a lower number of the users that indicated that the another review question was helpful.

5. The method of claim 1, further comprising:

selecting a second review question based on the assessed quality of the second review question, the assessed quality of the second review question being lower than the first review question; and transmitting instructions for outputting the first review question above the second review question in a user interface.

6. The method of claim 1, wherein said determining the helpfulness of the first review question comprises receiving user input from a plurality of users regarding the helpfulness of the first review question.

7. The method of claim 1, wherein said determining the helpfulness of the first review question comprises determining how long users view the first review question and assigning the helpfulness of the first review question from the determined viewing length.

8. The method of claim 7, wherein said determining how long users view the first review question comprises determining a period of time in which a portion of a display comprising the first review question is in an active pane on a user device.

9. A system for performing guided reviews of items, the system comprising:

a hardware processor configured to:

access a linked data structure comprising a plurality of item category nodes that are arranged hierarchically, wherein each of the item category nodes corresponds to one or more items in an electronic catalog and each of the item category nodes is linked to another item category node;

identify, from the plurality of item category nodes, a first item category node corresponding to a first item in the electronic catalog;

determine that the first item category node does not have a corresponding review question;

select, from the linked data structure, a second item category node linked to the first item category node;

determine that the second item category node has a plurality of review questions, wherein each of the review questions corresponds to either a positive or negative question category;

receive first web data comprising a first user rating for the first item;

determine that the first user rating has a negative aspect;

identify, from the plurality of review questions, a first review question with a respective negative question category that matches the negative aspect of the first user rating;

identify user-indicated helpfulness of user reviews of items in the electronic catalog, the user reviews being generated responsive to the first review question to which selected users provided answers;

score the first review question based at least in part on the identified user-indicated helpfulness;

select the first review question to present to a first user based at least in part on the score of the first review question; and transmit second web data comprising the first review question for presentation to the first user in order to elicit a review of the first item in the electronic catalog from the first user.

10. The system of claim 9, wherein the first review question comprises a review question parameter, and wherein the hardware processor is further configured to:

access metadata associated with the first item; and populate the review question parameter in the first review question with the metadata.

11. The system of claim 9, wherein the hardware processor is further configured to assign a higher score to the first review question that has a greater number of people that indicated that the first review question was helpful relative to another review question having a lower number of people that indicated that the another review question was helpful.

12. The system of claim 9, wherein the hardware processor is further configured to:

select a second review question based on a second score of the second review question, the second score of the second review question being lower than a first score of the first review question; and transmit instructions to output the first review question above the second review question in a user interface.

13. The system of claim 9, wherein the hardware processor is further configured to identify the user-indicated helpfulness of the user reviews based on an estimated length of time that users view the user reviews.

14. The system of claim 13, wherein the hardware processor is further configured to estimate the length of time that a user views one of the user reviews based at least on a time period in which an active pane of a browser depicts one of the user reviews.

15. Non-transitory physical computer storage comprising instructions stored thereon that, when executed by a processor, are configured to implement a system for performing guided reviews of items, the system configured to:

access a linked data structure comprising a plurality of item category nodes that are arranged hierarchically, wherein each of the item category nodes corresponds to one or more items in an electronic catalog and each of the item category nodes is linked to another item category node;

identify, from the plurality of item category nodes, a first item category node corresponding to a first item in the electronic catalog;

determine that the first item category node does not have a corresponding review question;

select, from the linked data structure, a second item category node linked to the first item category node;

determine that the second item category node has a plurality of review questions, wherein each of the review questions corresponds to either a positive or negative question category;

receive first web data comprising a first user rating for the first item;

determine that the first user rating has a positive aspect;

identify, from the plurality of review questions, a first review question with a respective positive question category that matches the positive aspect of the first user rating;

identify user-indicated helpfulness of user reviews of items in the electronic catalog, the user reviews being generated responsive to the first review question to which selected users provided answers;

score the first review question based at least in part on the identified user-indicated helpfulness;

select the first review question to present to a first user based at least in part on the score of the first review question; and transmit second web data comprising the first review question for presentation to the first user in order to elicit a review of the first item in the electronic catalog from the first user.

16. The non-transitory physical computer storage of claim 15, wherein the user-indicated helpfulness of the user reviews comprises data representing a number of people that indicated that the first review question was helpful.

17. The non-transitory physical computer storage of claim 15, wherein the system is further configured to assign a higher score to the first review question that has a greater number of people that indicated that the first review question was helpful relative to another review question having a lower number of people that indicated that the another review question was helpful.

18. The non-transitory physical computer storage of claim 15, wherein the system is further configured to identify the user-indicated helpfulness of the user reviews based on an estimated length of time that users view the user reviews.

19. The non-transitory physical computer storage of claim 18, wherein the system is further configured to estimate the length of time that a user views one of the user reviews based at least on a time period in which an active pane of a browser depicts one of the user reviews.

* * * * *